Patented Nov. 21, 1933

1,935,624

UNITED STATES PATENT OFFICE 1,935,624

AZO DYESTUFFS AND THEIR PRODUCTION

George Holland Ellis, Henry Charles Olpin, and Denis Houghton Mosby, Spondon, near Derby, England, assignors to Celanese Corporation of America, a corporation of Delaware No Drawing. Application August 19, 1930, Serial No. 476,444, and in Great Britain September 16, 1929

30 Claims. (Cl. 260—90).

This invention, which is a continuation in part of the invention claimed in co-pending United States applications S. Nos. 297,098 filed 2nd August, 1928 and 363,707 filed 16th May, 1929, relates to the manufacture of new azo dyestuffs and to the application thereof, and more particularly to their application to materials made of or containing organic substitution derivatives of cellulose, for example materials made of or containing cellulose acetate or other cellulose esters, for instance cellulose formate, propionate or butyrate and the products obtained by the treatment of alkalized cellulose with esterifying agents, (e. g. the products known as "immunized cotton" obtained by treatment with p-toluene sulphochloride) or made of or containing cellulose ethers, for example methyl, ethyl or benzyl cellulose, or the corresponding condensation products of cellulose and glycols or other polyhydric alcohols.

In our United States application S. No. 297,098 we have described new dyestuffs obtainable by coupling diazotized amino-anthraquinones or derivatives thereof with ω-hydroxy-ethyl-α-naphthylamine and γ-chlor-β-hydroxy-propyl-α-naphthylamine, and the colouration of cellulose acetate or other organic substitution derivatives of cellulose therewith. Further, in United States application S. No. 363,707, we have described the manufacture and application of azo dyestuffs prepared by coupling a diazotized 2:4-dinitro-6-alkoxy or 6-alkyl-aniline or derivatives thereof with ω-hydroxyethyl-α-naphthylamine and γ-chloro-β-hydroxy-propyl-α-naphthylamine. The latter dyestuffs were found to be of particular value on account of their violet to blue shades and the ease with which they could be discharged.

We have now found that the unsulfonated compounds of the naphthalene series containing as substituents in the nucleus one or more hydroxy-alkylamino groups are of general applicability in the synthesis of azo colouring matters particularly suited to the colouration of cellulose acetate and other organic substitution derivatives of cellulose.

According to the present invention new azo dyestuffs are prepared by coupling diazotized aromatic amino compounds with unsulfonated coupling components of the naphthalene series which contain in the nucleus an α-amino group, one or more hydrogen atoms of which are replaced by an aliphatic side chain containing a hydroxy group or groups.

The new colouring matters when derived from diazo components containing not more than one sulphonic group, are in general characterized by excellent affinity for materials made of or containing cellulose acetate or other organic substitution derivatives of cellulose, and the colourations obtained thereon are characterized in general by the ease with which they may be discharged by reduction discharges.

Examples of coupling components suitable for use with the present invention are ω-hydroxyethyl-α-naphthylamine and γ-chloro-β-hydroxypropyl-α-naphthylamine, and other hydroxyalkyl-naphthylamines obtainable by condensing α-naphthylamines, whether primary or secondary, with halohydrins, for example ethylene chlorhydrin, propylene chlorhydrins, glyceryl chlorhydrins, glyceryl dichlorhydrins, epichlorhydrin, and chlorbutylene glycol, or with alkylene oxides such as ethylene oxide or propylene oxide.

As diazo components there may be employed diazotizable aromatic amines of any desired series, and particularly those of the benzene or naphthalene series, e. g. aniline, or α-naphthylamine or their homologues or nuclear substitution products. Examples of such nuclear substituted amines are the halogen, nitro, hydroxy, alkoxy, and carboxy derivatives. If desired disand poly-azo dyes may be prepared in accordance with the invention, for example disazo dyes may be prepared by employing, as diazo components, amino-azo-compounds, e. g. amino-azobenzene, amino-azo-toluene, benzene-azo-α-naphthylamine and the like. Especially useful results are obtained by the employment of nitrated aromatic amines as diazo components, for example nitro-anilines, nitro-toluidines, nitro-anisidines, and nitro-phenetidines, e. g. para-nitraniline, 2:4-dinitro-aniline, para-nitro-ortho-toluidine, para-nitro-ortho-anisidine, and para-nitro-ortho-phenetidine.

The colouring matters derived from nitrated aromatic amines, especially unsulfonated p-nitrated aromatic amines, by diazotizing and coupling with the N-hydroxy-alkyl derivatives of α-naphthylamine or its substitution products are of particular value as certain of these colouring matters yield on cellulose acetate or other organic substitution derivatives of cellulose exceptionally strong blue to violet shades which, moreover, are readily dischargeable by means of reduction discharges, for example those commonly employed in the art of textile printing. It will be appreciated that these colouring matters yielding readily dischargeable blue to violet shades on cellulose acetate or other cellulose esters or ethers are of great value in view of the very limited range of the hitherto known dischargeable blue to violet dyestuffs for cellulose esters or ethers.

The new azo colouring matters may be formed on the fibre or material or may be prepared in substance. They are, as indicated previously, especially of value for dyeing, printing, stencilling or otherwise colouring materials comprising cellulose acetate or other cellulose esters or comprising cellulose ethers, whether such dyestuffs be applied as such or formed on the fibre. The dyestuffs or the components thereof (where the dyestuff itself is to be formed on the material) may be applied to the cellulose esters or ethers in the form of aqueous solutions, for example aqueous solutions of salts, or in the form of aqueous suspensions or dispersions produced by any suitable methods, or in any other convenient form. Dispersions of the dyestuffs or components which are insoluble or relatively insoluble in water may be obtained, for example, by grinding with or without water and with or without dispersators and/or protective colloids (for instance in the so-called colloid mills), by dissolving in a solvent and mixing the solution with water containing or not containing protective colloids and/or dispersators, or they may be dispersed by means of dispersators, for example by the methods described in United States Patents Nos. 1,618,413, 1,618,414, 1,694,413, 1,690,481 and 1,716,721, and United States applications S. Nos. 152,517 filed 3rd December, 1926, 134,138 filed 7th September, 1926, 390,423 filed 4th September, 1929 and 390,424 filed 4th September, 1929.

Dispersions of the new dyestuffs may be directly prepared of a strength suitable for dyeing or they may be prepared in the form of more or less concentrated preparations, whether in liquid, paste, solid, powder, or other form, yielding dyebaths by dilution with water with or without addition of dispersators and/or protective colloids or other additions.

Preparations comprising the new colouring matters in dispersed form and/or in admixture with dispersing agents with or without protective colloids are included in and form an important feature of the present invention.

As stated above, the new dyestuffs are of particular value for obtaining discharge effects on materials made of or containing cellulose esters or ethers and for this purpose they may be applied to the materials with or without the use of any other dyestuffs dischargeable or otherwise, and having an affinity for the cellulose derivatives or for any fibres used in association therewith, such other dyestuffs being applied before, after, or where possible together with the dyestuffs of the present invention. For the production of discharge effects thereon any suitable reduction discharge may be employed, and with the reducing agent used in the discharge paste or liquor there may be incorporated dyestuffs which resist the discharge agents, for example vat, basic or other colours, so as to obtain coloured discharge effects.

Discharge resist effects may be obtained by applying a white or coloured discharge to the materials before the application of the dischargeable dyestuffs.

In addition to their use for the production of self shades the new dyestuffs may be used in conjunction with suitable other dyestuffs for the production of their dischargeable compound shades, such as fawns, greens, blacks, and so forth. If desired any of the new dyestuffs which contain diazotizable amino groups may be diazotized on the fibre and developed with any suitable developer.

The following examples illustrate the best methods known to us of carrying the invention into effect:—

*Example 1*

34.5 parts p-nitro-aniline are dissolved in 80 parts of hydrochloric acid diluted with 500 parts of water, poured on to ice and diazotized with 18 parts of sodium nitrite dissolved in 90 parts of water at 0.5° C. The solution is allowed to stand for a short time and the excess nitrous acid destroyed with urea. The diazo solution is coupled with 59 parts γ-chlor-β-hydroxy-propyl-α-naphthylamine

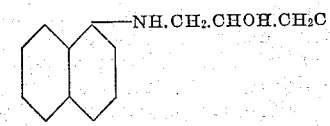

dissolved in 500 parts of water with the addition of 25 parts of hydrochloric acid. Coupling is completed by the addition of sufficient sodium acetate solution to neutralize the mineral acid. After stirring for a short time the dyestuff is filtered and washed well with water. Applied by dispersion methods it yields on cellulose acetate materials bright reddish-violet shades readily dischargeable by reduction methods.

It has the probable formula

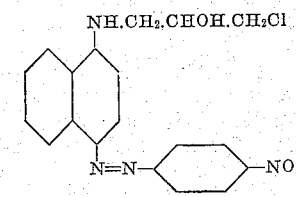

*Example 2*

16.8 parts of p-nitro-o-anisidine are dissolved in 37 parts of hydrochloric acid diluted with 100 parts of water, poured on to ice and diazotized with 7.2 parts of sodium nitrite dissolved in 40 parts water at 0.5° C. for ten minutes. Excess nitrous acid is destroyed with urea and the diazo-solution then coupled with 23.6 parts of γ-chlor-β-hydroxy-propyl-α-naphthylamine dissolved in 1000 parts of water, coupling being completed by the addition of sodium acetate solution until no free mineral acid remains. After stirring for a short time the dyestuff is filtered and washed well with water. Applied by dispersion methods to cellulose acetate materials it yields brilliant violet shades which are readily dischargeable by reduction methods.

*Example 3*

36 parts of 5-nitro-2-amino-phenetole are dissolved in 300 parts of concentrated hydrochloric acid and 1000 parts of water, and the solution poured on to ice and diazotized with 14 parts sodium nitrate dissolved in 100 parts of water. The diazo solution is coupled with 47 parts γ-chlor-β-hydroxy-propyl-α-naphthylamine dissolved in 2000 parts of water with the addition of 30 parts of hydrochloric acid, and coupling completed by adding sodium acetate solution until no mineral acid is present. The dyestuff is then filtered and washed with water. The colouring matter, applied by dispersion methods, dyes cellulose acetate materials in violet shades which are readily dischargeable.

Example 4

A mixture of 100 parts 50% picramic acid paste, 330 parts of concentrated hydrochloric acid, and 1000 parts of water is stirred for a few minutes at the boil and then cooled to 10° C. by addition of ice. A solution of 18 parts of sodium nitrite in 200 parts of water is added little by little and the temperature afterwards raised to 30° C., and maintained for half an hour. The mixture is then filtered, excess nitrous acid destroyed with urea, and 1000 parts of 30% sodium acetate solution added. A solution of 59 parts of γ-chlor-β-hydroxy-propyl-α-naphthylamine in 2000 parts of water with the addition of 20 parts of hydrochloric acid is then added to the diazo-solution until no diazo compound remains. Then after stirring for half an hour, the dyestuff is filtered off and washed with water. Applied by dispersion methods it dyes cellulose acetate materials in heliotrope shades.

Example 5

A mixture of 48 parts of p-amino-p'-dimethylaminoazo-benzene, 5000 parts of water and 60 parts hydrochloric acid are stirred into a paste, boiled for a few minutes and then cooled below 5° C. with ice. A solution of 14 parts sodium nitrite in 200 parts of water is added and the whole stirred for half an hour, filtered, and the excess nitrous acid destroyed with urea. A solution of 47.2 parts γ-chlor-β-hydroxy-propyl-α-naphthylamine in 1000 parts of water and 20 parts of hydrochloric acid is then added to the filtered diazo solution, followed by a solution of sodium acetate to complete the coupling. After stirring for half an hour the dyestuff is filtered and washed with water. It dyes cellulose acetate materials in bluish-red shades.

Example 6

12.4 parts of benzene-azo-α-naphthylamine are ground with 50 parts of hydrochloric acid and 50 parts of water. The suspension is boiled for a few minutes, poured on to ice, and diazotized with 3.6 parts of sodium nitrite at 30° C. for half an hour. The diazo solution is then filtered and the excess nitrous acid destroyed with urea. A solution of 11.8 parts of γ-chlor-β-hydroxy-propyl-α-naphthylamine is then added until there is no free diazo compound present. Coupling is completed by neutralizing the mineral acid with sodium acetate and the colouring matter filtered off and washed. Applied by dispersion methods, it yields on cellulose acetate materials violet grey shades readily discharged by means of reduction discharges.

Example 7

21.8 parts of p-nitro-aniline-o-sulphonic acid are dissolved by warming with 60 parts concentrated hydrochloric acid (30% strength) and a little water, and diluted to 500 parts with ice and water. To the clear solution is added all at once, with stirring, a solution of 7 parts of sodium nitrite in 70 parts of water, when the insoluble diazonium salt separates. This is now run slowly into a solution of 18.7 parts ω-hydroxy-ethyl-α-naphthylamine of the formula

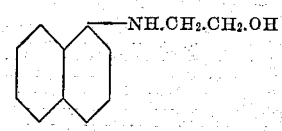

in 20 parts of concentrated hydrochloric acid diluted with 500 parts water, at normal temperature. Coupling commences immediately and is complete within a few hours. The precipitated dyestuff is filtered off, and washed well with water. It is completely soluble in alkaline solutions, and dyes cellulose acetate fibres in red shades from baths slightly acidified with acetic acid.

It has the probable formula

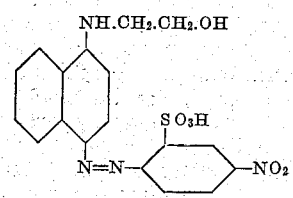

Example 8

13.8 parts of metanitraniline are dissolved in 37 parts of hydrochloric acid diluted with 100 parts of water, poured on to ice and diazotized by adding all at once, with stirring, 7.2 parts of sodium nitrite dissolved in 40 parts of water at 0–5° C. The diazo solution is now run into a solution of 18.7 parts of ω-hydroxy-ethyl-α-naphthylamine in 20 parts of concentrated hydrochloric acid diluted with 500 parts of water, at normal temperature. Coupling commences immediately and is completed by periodic addition of sodium acetate to correct mineral acidity. When coupling is complete the dyestuff is collected and washed well with water. It is preferably retained as an aqueous paste. Applied by dispersion methods to cellulose acetate materials it yields bright orange shades which are readily dischargeable by reduction methods.

Example 9

16.8 parts of p-nitro-o-anisidine are dissolved in 37 parts of hydrochloric acid diluted with 100 parts of water, poured on to ice and diazotized by adding all at once, with stirring, 7.2 parts of sodium nitrite dissolved in 40 parts of water at 0–5° C. The diazo solution is now run into a solution of 18.7 parts of ω-hydroxy-ethyl-α-naphthylamine in 20 parts of concentrated hydrochloric acid (30%) diluted with 500 parts of water, at normal temperature. Coupling commences immediately and is completed by periodic addition of sodium acetate to correct mineral acidity. When coupling is complete the dyestuff is collected and washed well with water. It is preferably retained as an aqueous paste. Applied by dispersion methods to cellulose acetate materials it yields red violet shades which are readily dischargeable by reduction methods.

The following table shows some further dyestuffs obtainable in accordance with the invention together with the shades yielded by them on cellulose acetate. All the shades are more or less readily dischargeable by means of reduction discharges.

| Dyestuff | | Shade on cellulose acetate |
|---|---|---|
| Diazo component | Coupling component | |
| o-nitraniline | ω-hydroxyethyl-α-naphthylamine | Scarlet |
| p-chlor-o-nitraniline | ω-hydroxyethyl-α-naphthylamine | Orange |
| o-nitraniline | γ-chlor-β-hydroxypropyl-α-naphthylamine | Red |
| o-anisidine | γ-chlor-β-hydroxypropyl-α-naphthylamine | Orange |
| o-nitraniline | γ-chlor-β-hydroxypropyl-α-naphthylamine | Bluish-red |
| p-chlor-o-nitraniline | γ-chlor-β-hydroxypropyl-α-naphthylamine | Orange |
| p-chloraniline | γ-chlor-β-hydroxypropyl-α-naphthylamine | Scarlet |
| m-nitraniline | γ-chlor-β-hydroxypropyl-α-naphthylamine | Reddish-orange |
| p-amino-diphenylamine | γ-chlor-β-hydroxypropyl-α-naphthylamine | |

What we claim and desire to secure by Letters Patent is:—

1. Process for the production of new azo dyestuffs comprising coupling an aromatic diazo compound with an unsulphonated α-naphthylamine coupling component substituted in an α-amino group by an aliphatic radicle containing at least one hydroxyl group.

2. Process for the production of new azo dyestuffs comprising coupling a diazo compound of the benzene series with an unsulphonated α-naphthylamine coupling component substituted in an α-amino group by an aliphatic radicle containing at least one hydroxyl group.

3. Process for the production of new azo dyestuffs comprising coupling an unsulphonated diazo compound of the benzene series with an unsulphonated α-naphthylamine coupling component substituted in an α-amino group by an aliphatic radicle containing at least one hydroxyl group.

4. Process for the production of new azo dyestuffs comprising coupling an unsulphonated aromatic diazo compound with a compound of the general formula:

wherein R is hydrogen or an alkyl group and $R_1$ is an aliphatic radicle containing at least one hydroxyl group.

5. Process for the production of new azo dyestuffs comprising coupling an unsulphonated diazo compound of the benzene series with a compound of the general formula:

wherein R is hydrogen or an alkyl group and $R_1$ is an aliphatic radicle containing at least one hydroxyl group.

6. Process for the production of new azo dyestuffs comprising coupling an unsulphonated diazo compound of the benzene series with hydroxy-ethyl-α-naphthylamine.

7. Process for the production of new azo dyestuffs comprising coupling an unsulphonated diazo compound of the benzene series with γ-chlor-β-hydroxypropyl-α-naphthylamine.

8. Process for the production of new azo dyestuffs comprising coupling an unsulphonated nitrated diazo compound of the benzene series with an unsulphonated α-naphthylamine coupling component substituted in an α-amino group by an aliphatic radical containing at least one hydroxyl group.

9. Process for the production of new azo dyestuffs comprising coupling an unsulphonated nitrated diazo compound of the benzene series with a compound of the general formula:

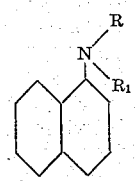

wherein R is hydrogen or an alkyl group and $R_1$ is an aliphatic radicle containing at least one hydroxyl group.

10. Process for the production of new azo dyestuffs comprising coupling an unsulphonated nitrated diazo compound of the benzene series with hydroxy-ethyl-α-naphthylamine.

11. Process for the production of new azo dyestuffs comprising coupling an unsulphonated nitrated diazo compound of the benzene series with γ-chlor-β-oxypropyl-α-naphthylamine.

12. Process for the production of new azo dyestuffs comprising coupling an unsulphonated para-nitrated diazo compound of the benzene series with an unsulphonated α-naphthylamine coupling component substituted in an α-amino group by an aliphatic radical containing at least one hydroxyl group.

13. Process for the production of new azo dyestuffs comprising coupling an unsulphonated para-nitrated diazo compound of the benzene series with a compound of the general formula:

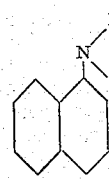

wherein R is hydrogen or an alkyl group and $R_1$ is an aliphatic radicle containing at least one hydroxyl group.

14. Process for the production of new azo dyestuffs comprising coupling an unsulphonated para-nitrated diazo compound of the benzene series with hydroxy-ethyl-α-naphthylamine.

15. Process for the production of new azo dyestuffs comprising coupling an unsulphonated para-nitrated diazo compound of the benzene series with γ-chlor-β-hydroxypropyl-α-naphthylamine.

16. Process for the production of a new azo dyestuff comprising coupling diazotized 5-nitro-2-anisidine with ω-hydroxy-ethyl-α-naphthylamine.

17. Process for the production of a new azo dyestuff comprising coupling diazotized 5-nitro- 2-anisidine with γ-chlor-β-hydroxy-propyl-α-naphthylamine.

18. Azo dyestuffs of the general formula Y.N₂.Z, wherein Y represents an aromatic residue and Z represents an unsulphonated radicle of the naphthalene series substituted in an α-amino group by an aliphatic radicle containing at least one hydroxyl group.

19. Azo dyestuffs of the general formula Y.N₂.Z, wherein Y represents a residue of the benzene series and Z represents an unsulphonated radicle of the naphthalene series substituted in an α-amino group by an aliphatic radicle containing at least one hydroxyl group.

20. Azo dyestuffs of the general formula Y.N₂.Z, wherein Y represents an unsulphonated residue of the benzene series and Z represents an unsulphonated radicle of the naphthalene series substituted in an α-amino group by an aliphatic radicle containing at least one hydroxyl group.

21. An azo dyestuff of the general formula

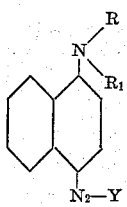

wherein Y represents an unsulphonated aromatic radicle, R an aliphatic radicle containing at least one hydroxyl group and R₁ hydrogen or an alkyl group or an aliphatic radicle containing at least one hydroxyl group.

22. An azo dyestuff of the general formula

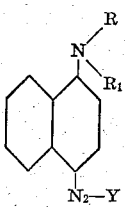

wherein Y represents an unsulphonated radicle of the benzene series, R an aliphatic radicle containing at least one hydroxyl group and R₁ hydrogen or an alkyl group or an aliphatic radicle containing at least one hydroxyl group.

23. An azo dyestuff of the general formula

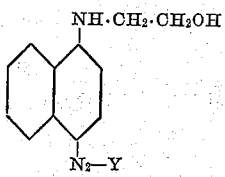

wherein Y represents an unsulphonated aromatic radicle.

24. An azo dyestuff of the general formula

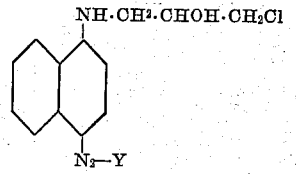

wherein Y represents an unsulphonated aromatic radicle.

25. An azo dyestuff of the general formula

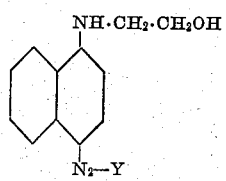

wherein Y represents an unsulphonated radicle of the benzene series.

26. An azo dyestuff of the general formula

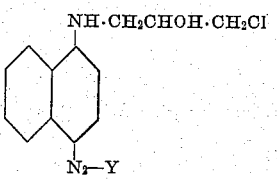

wherein Y represents an unsulphonated radicle of the benzene series.

27. An azo dyestuff of the general formula

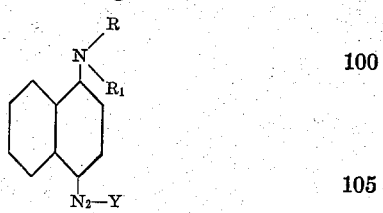

wherein Y represents an unsulphonated nitrated radicle of the benzene series, R an aliphatic radicle containing at least one hydroxyl group and R₁ hydrogen or an alkyl group or an aliphatic radicle containing at least one hydroxyl group.

28. An azo dyestuff of the general formula

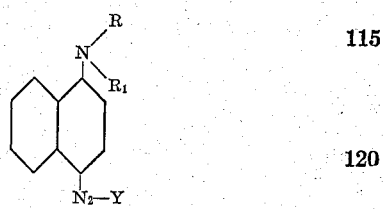

wherein Y represents an unsulphonated para-nitrated radicle of the benzene series, R an aliphatic radicle containing at least one hydroxyl group and R₁ hydrogen or an alkyl group or an aliphatic radicle containing at least one hydroxyl group.

29. An azo dyestuff of the formula:

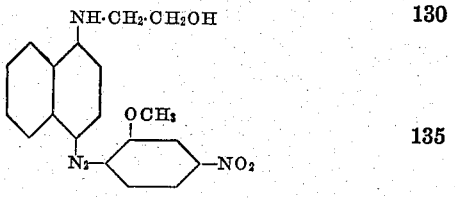

30. An azo dyestuff of the formula:

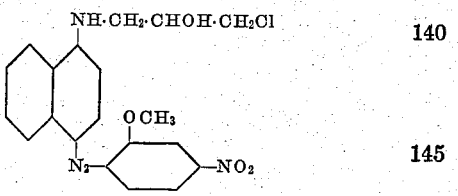

GEORGE HOLLAND ELLIS.
HENRY CHARLES OLPIN.
DENIS HOUGHTON MOSBY.